(12) United States Patent
Fu et al.

(10) Patent No.: US 9,250,508 B1
(45) Date of Patent: Feb. 2, 2016

(54) REAR PROJECTION SCREEN WITH PIN-HOLE CONCENTRATOR ARRAY

(71) Applicant: Google Inc., Mountain View, CA (US)

(72) Inventors: Belle Fu, Taipei (TW); Serge J. Bierhuizen, San Jose, CA (US); Mary Lou Jepsen, Sausalito, CA (US); Andrei S. Kazmierski, Pleasanton, CA (US); Adam E. Norton, Palo Alto, CA (US); Nicholas C. Loomis, Oakland, CA (US); Philip E. Watson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/543,616

(22) Filed: Nov. 17, 2014

(51) Int. Cl.
*G03B 21/62* (2014.01)
*G03B 21/625* (2014.01)
*G02B 5/30* (2006.01)

(52) U.S. Cl.
CPC .............. *G03B 21/62* (2013.01); *G03B 21/625* (2013.01); *G02B 5/3033* (2013.01)

(58) Field of Classification Search
CPC .............................. G03B 21/62; G03B 21/625
USPC .......................................................... 359/460
See application file for complete search history.

(56) References Cited

U.S. PATENT DOCUMENTS

| | | | |
|---|---|---|---|
| 5,563,738 A | 10/1996 | Vance | |
| 5,724,182 A | 3/1998 | Mitani et al. | |
| 6,449,089 B1 | 9/2002 | Moshrefzadeh et al. | |
| 6,466,368 B1 | 10/2002 | Piepel et al. | |
| 6,469,830 B1 | 10/2002 | Dubin et al. | |
| 6,535,333 B1 | 3/2003 | Piepel et al. | |
| 6,636,355 B2 | 10/2003 | Moshrefzadeh et al. | |
| 6,754,005 B2 | 6/2004 | Goto et al. | |
| 6,829,086 B1 | 12/2004 | Gibilini | |
| 7,233,439 B2 | 6/2007 | Shimizu | |
| 7,443,583 B2 | 10/2008 | Yamauchi | |
| 7,453,635 B2 | 11/2008 | Yeo et al. | |
| 7,980,716 B2 | 7/2011 | Hirata et al. | |
| 8,004,760 B2 | 8/2011 | Liu et al. | |
| 8,233,217 B2 | 7/2012 | Kindler et al. | |
| 8,369,012 B2 | 2/2013 | Hannington | |
| 2001/0040263 A1 | 11/2001 | Nakai | |
| 2002/0109916 A1 | 8/2002 | Moshrefzadeh | |
| 2003/0184993 A1 | 10/2003 | Yamada | |
| 2005/0041287 A1* | 2/2005 | Goto | 359/456 |
| 2006/0061861 A1 | 3/2006 | Munro et al. | |

(Continued)

OTHER PUBLICATIONS

Duparre, J. et al., "Novel Optics/Micro-Optics for Miniature Imaging Systems", Fraunhofer Institute for Applied Optics and Precision Engineering, SUSS MicroOptics SA (2006) 15 pages.

(Continued)

*Primary Examiner* — Christ Mahoney
(74) *Attorney, Agent, or Firm* — Blakely Sokoloff Taylor & Zafman LLP

(57) ABSTRACT

A rear projection screen includes an array of pin-hole apertures to pass display light incident from a first side of the rear projection screen through to a viewing side of the rear projection screen opposite the first side. An array of concentrator structures surrounds the pin-hole apertures and defines concentrating optical pathways. The concentrating optical pathways each have an input aperture for collecting the display light and an output defined by a corresponding one of the pin-hole apertures to emit the display light. The input apertures are larger than the pin-hole apertures.

20 Claims, 8 Drawing Sheets

(56) References Cited

U.S. PATENT DOCUMENTS

| | | | |
|---|---|---|---|
| 2006/0087732 A1* | 4/2006 | Shinbo | 359/455 |
| 2006/0209403 A1 | 9/2006 | Parusel et al. | |
| 2006/0268404 A1* | 11/2006 | Hyobu | 359/456 |
| 2007/0115548 A1 | 5/2007 | Ebina et al. | |
| 2007/0171523 A1* | 7/2007 | Yoon | 359/455 |
| 2010/0214196 A1* | 8/2010 | Browaeys | 345/60 |
| 2010/0271721 A1* | 10/2010 | Gaides et al. | 359/885 |
| 2011/0157887 A1 | 6/2011 | Jeong et al. | |
| 2013/0076737 A1* | 3/2013 | Park et al. | 345/419 |

OTHER PUBLICATIONS

Wolfe, C.R. et al., "Characterization of *BlackScreen*™ for Rear-Projection Television", Proc. of SPIE vol. 5002 (2003) Downloaded From: http://spiedigitallibrary.org/ on Nov. 19, 2013, pp. 97-105.

Morris, G.M. et al., "Engineered diffusers™ for display and illumination systems: Design, fabrication, and applications", www.RPCphotonics.com, downloaded from Internet prior to Jun. 12, 2014, 11 pages.

Sales, Tasso R.M. et al., "Light Tamers Engineered microlens arrays provide new control for display and lighting applications", Photonics Spectra, Reprinted from the Jun. 2004 issue of Photonics Spectra, 4 pages.

Vikuiti™, "Vikuiti™ Rear Projection Film", Vikuiti Display Enhancement 3M, Data sheet Oct. 2006, 3M Optical Systems Division, 6 pages.

Vikuiti™, "Vikuiti™ Rear Projection Display Screen", Vikuiti Projection Display Components 3M, 3M Optical Systems Division, downloaded from Internet prior to Jun. 12, 2014, 8 pages.

Norton, A.E. et al., "High Contrast Rear Projection Screen", U.S. Appl. No. 14/303,163, filed Jun. 12, 2014, whole document.

Kazmierski, A. et al., "High Contrast Rear Projection Screen for Use With a Diverging Illumination Source", U.S. Appl. No. 14/303,190, filed Jun. 12, 2014, whole document.

* cited by examiner

REAR PROJECTION SCREEN WITH PIN-HOLE CONCENTRATOR ARRAY

TECHNICAL FIELD

This disclosure relates generally to display technologies, and in particular but not exclusively, relates to rear projection screens.

BACKGROUND INFORMATION

Conventional rear projection screens use a thin diffusing layer in the form of a matte screen. An image is projected onto the back of the diffusing layer, where it is diffused and scattered into the viewing environment. The diffusing layer provides an image surface and its diffusive nature serves to increase the viewing angles from which the image can be observed. Often these simple diffusing layer projection screens have poor contrast in well-lit rooms. This poor contrast is due, at least in part, from the scattering of ambient light back into the viewing environment, thereby deleteriously affecting the black levels and contrast of the rear projection screen.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, a system and a method of operation for a rear projection screen including an array of pin-hole apertures are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIGS. 1-9 illustrate embodiments of a rear projection screen including an array of pin-hole apertures surrounded by an array of concentrator structures that each include various features. It should be appreciated that in many instances, FIGS. 1 through 9 do not illustrate mutually exclusive features. Rather, the features illustrated in FIGS. 1 through 9 may be combined in various different combination embodiments and the various features may operate in cooperation with each other.

Figure 1:
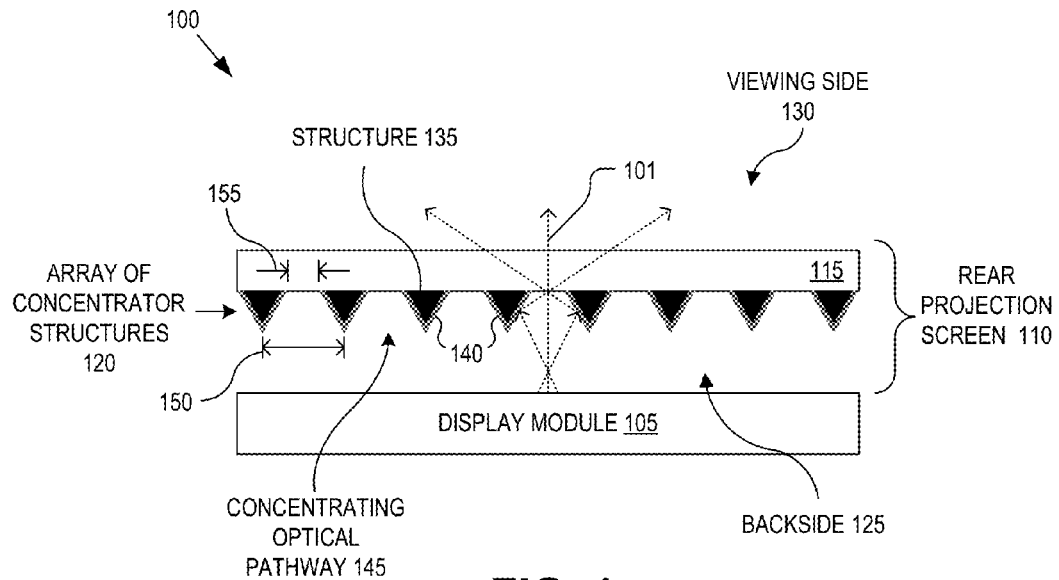
FIG. 1 illustrates a display panel including a rear projection screen having an array of concentrating structures with metallic reflective coatings, in accordance with an embodiment of the disclosure.

FIG. 1 illustrates a display panel 100, in accordance with an embodiment of the disclosure. The illustrated embodiment of display panel 100 includes a display module 105 and a rear projection screen 110. The illustrated embodiment of rear projection screen 110 includes a transparent substrate 115 having an array of concentrator structures 120 disposed across a back side 125 opposite a viewing side 130 of rear projection screen 110. The illustrated embodiment of array 120 includes structures 135 with reflective interfaces 140 that define concentrating optical pathways 145. The concentrating optical pathways 145 have an input aperture 150 for receiving display light 101 from display module 105 and a pin-hole aperture 155 for emitting display light 101 into the viewing environment. It should be appreciated that in many cases only a single instance of an illustrated element having many instances is labelled so as not to clutter the drawings.

The array of concentrator structures 120 defines concentrating optical pathways 145 that collect and concentrate display light 101 into an array of pin-hole apertures 155. The larger input apertures 150 efficiently collect display light 101 output from display module 105 by increasing the acceptance angle of display light 101. Each optical pathway 145 reflectively concentrates the collected light from the larger input aperture 150 down to the smaller pin-hole aperture 155. This concentration of display light 101 into pin-hole apertures 155 serves to increase the divergence of display light 101 emitted from the viewing side 130. The increased divergence provides for a greater viewing angle of display panel 100.

In one embodiment, structures 135 are formed of a black light absorbing material (e.g., patterned photo resist, etc.) that absorbs ambient light incident upon the structures 135 from viewing side 130. The concentrating cross-sectional shape of optical pathways 145 increases the light absorbing surface area of the viewing side 130, thereby increasing the image contrast of rear projection screen 110. From viewing side 130, concentrating structures 120 define a black light absorbing array of pin-hole apertures 155. From backside 125, concentrator structures 120 define large input apertures 145 that efficiently collect display light 101.

Transparent substrate 115 is a mechanical structure upon which concentrator structures 120 are disposed. Transparent substrate 115 may be fabricated of a variety of transparent materials, such as glass or plastic. Reflective interfaces 140 are disposed along oblique surfaces of structures 135 to define optical pathways 145. Reflective interfaces 140 may be implemented as reflective coatings of metal (e.g., aluminum, silver, tin, etc.) or be implemented as a total internal reflection ("TIR") surface, where the optical pathways 145 have a higher refractive index than the material of reflective interfaces 140. In one embodiment, optical pathways 145 are filled with a transparent planarization material. In another embodiment, optical pathways 145 are filled with a gas (e.g., air).

Display module 105 may be implemented with a variety of display technologies. For example, display module 105 may be implemented as a backlit display, such as a liquid crystal display ("LCD") that is backlit by an illumination structure. In another embodiment, display module 105 may be a direction emission display technology such as an organic light emitting diode ("OLED") display. Other display technologies may be used.

Figure 2:
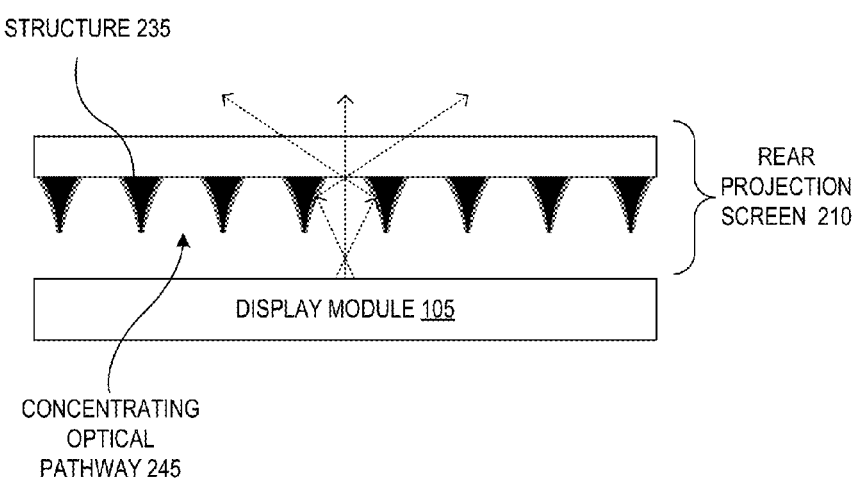
FIG. 2 illustrates a display panel including a rear projection screen having an array of concentrating structures forming concentrating optical pathways with parabolic cross-sections, in accordance with an embodiment of the disclosure.

FIG. 1 illustrates an embodiment where structures 135 have triangular cross-sections that define concentrating optical pathways 145 with trapezoid cross-sections. Of course, in various other embodiments, structures 135 may have different cross-sections that define optical pathways 145 with different concentrating cross-sectional shapes. For examples, FIG. 2 illustrates a rear projection screen 210 where the structures 235 have curved surfaces that define concentrating optical pathways 245 with parabolic cross-sections. Other slopes or curvatures may be implemented.

Figure 3:
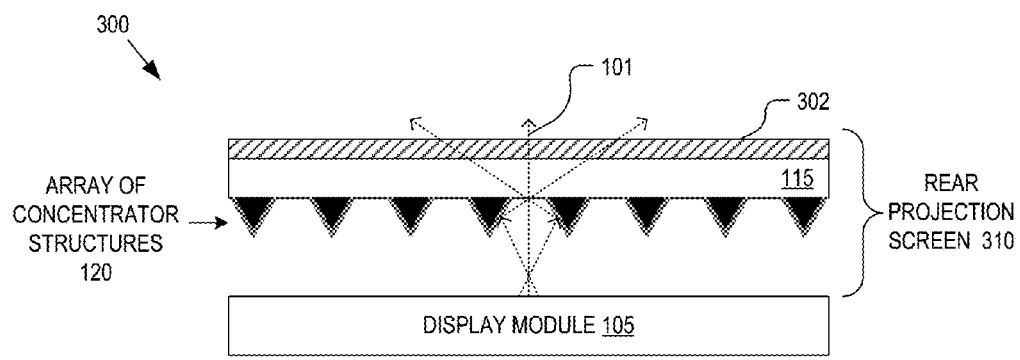
FIG. 3 illustrates a display panel including a rear projection screen having an overlaid circular polarizer, in accordance with an embodiment of the disclosure.

FIG. 3 illustrates a display panel 300 including a rear projection screen 310 having an overlaid circular polarizer 302, in accordance with an embodiment of the disclosure. FIG. 3 illustrates how the rear projection screens disclosed herein can incorporate a circular polarizer to reduce ambient light reflections off viewing side 130 and further increase the contrast ratio of the rear projection screen. In one embodiment, circular polarizer 302 includes a linear polarizing layer laminated to a quarter-wave retarder. This structure converts unpolarized light incident upon viewing side 130 into circular polarized light having a first handedness, which flips to the opposing handedness upon reflection off transparent substrate 115 and is subsequently absorbed.

Figure 4:
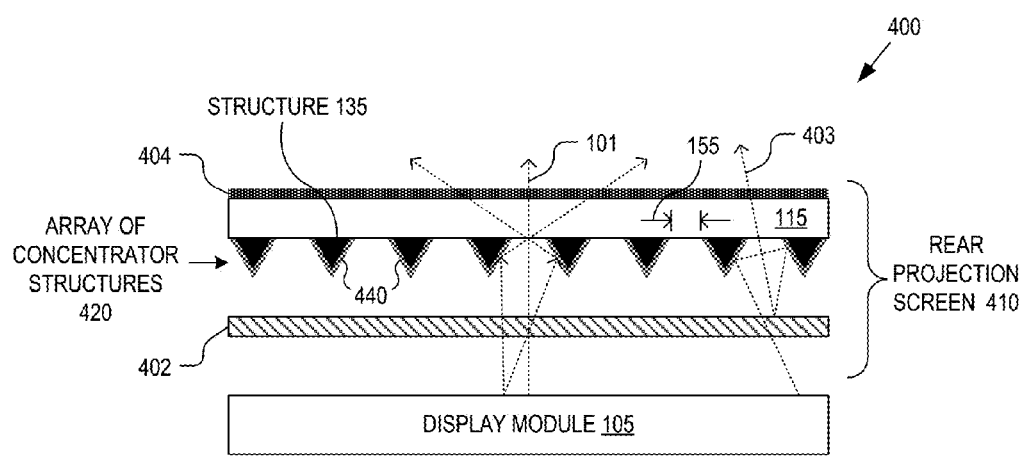
FIG. 4 illustrates a display panel including a rear projection screen including a linear polarizing layer disposed behind an array of concentrator structures, in accordance with an embodiment of the disclosure.

FIG. 4 illustrates a display panel 400 including a rear projection screen 410 having a linear polarizing layer 402 to increase optical efficiency, in accordance with an embodiment of the disclosure. The illustrated embodiment of concentrator structures 420 includes structures 135 having reflective interfaces implemented as reflective scattering layers 440. Reflective scattering layers 440 randomize the polarization of display light upon reflection. Linear polarizing layer 402 is implemented as a reflective polarizing layer.

During operation, display light 101 output from display module 105 may be polarized light that is aligned to pass through linear polarizing layer 402. Upon reflection off of concentrator structures 420, a first portion of the display light (e.g., display light 101) is concentrated and passed through pin-hole apertures 155 to the viewing side 130. However, a second portion of the display light (e.g., display light 403) is reflected back towards display module 105. By positioning linear polarizing layer 402 between concentrator structures 420 and display module 105, the back reflected display light is once again incident upon linear polarizer layer 402. Since reflective scattering layers 440 randomize the polarization of the reflected display light 403, a portion (e.g., as high as 50%) of the reflected display light 403 is again reflected back towards viewing side 130 for emission out a pin-hole aperture 155.

The illustrated embodiment of display panel 400 further includes an optional optical layer 404. Optical layer 404 may be an anti-reflective coating to increase emission efficiency, an anti-glare coating to reduce ambient light reflections, and/or an array of micro-lenses to further increase a divergence of the emitted display light for increased viewing angles. The addition of one or both of linear polarizing layer 402 and optical layer 404 serves to increase the optical efficiency of the display panel.

Figure 5:
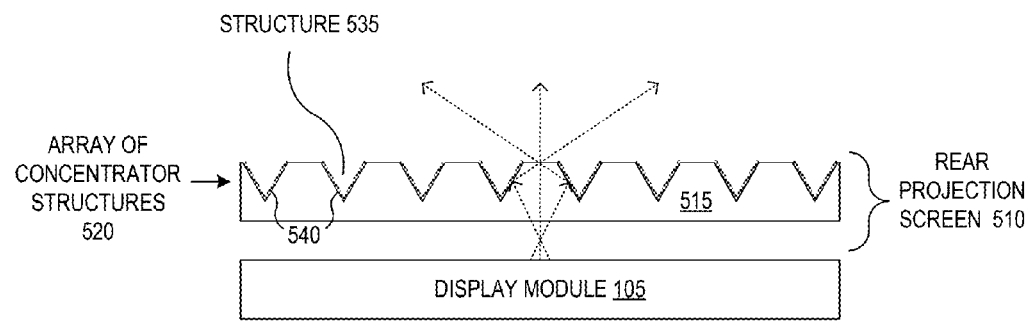
FIG. 5 illustrates a display panel including a rear projection screen having an array of concentrating structures with ("TIR") total internal reflection interfaces, in accordance with an embodiment of the disclosure.
Figure 6:
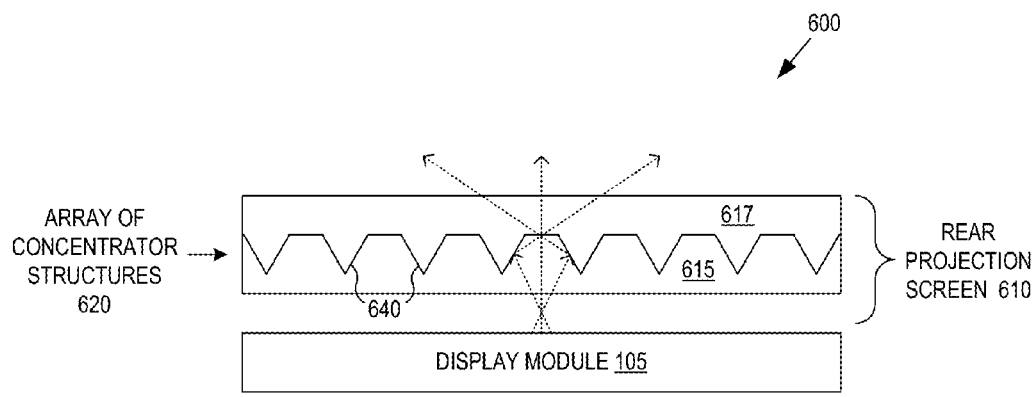
FIG. 6 illustrates a display panel including a rear projection screen having an array of concentrating structures with ("TIR") total internal reflection interfaces, in accordance with an embodiment of the disclosure.

FIGS. 5 and 6 illustrate various display panel embodiments where the reflective interfaces of the concentrator structures use TIR to reflect and concentrate display light 101. FIG. 5 illustrates a display panel 500 including a rear projection screen 510 having a transparent substrate 515. The array of concentrator structures 520 are disposed in and across transparent substrate 515. The illustrated embodiment of concentrator structures 520 include a structure 535 lined with TIR interface layers 540. In one embodiment, TIR interface layers 540 and transparent substrate 515 comprise transparent optical materials where the refractive index of transparent substrate 515 is higher than the refractive index of TIR interface layers 540. For example, transparent substrate 515 may be fabricated of an optical grade plastic and structures 535 formed into transparent substrate 515 using a UV imprinting process and the TIR interface layers 540 disposed into structures 535 via an optical bonding technique. In one embodiment, structures 535 may be filled with a black light absorbing material (similar to display panel 100 in FIG. 1) to improve the screen contrast.

FIG. 6 illustrates a display panel 600 including a rear projection screen 610 having a transparent substrate 615, in accordance with an embodiment of the disclosure. The TIR reflective interfaces 640 of concentrator structures 620 are formed as an index interface between transparent substrate 615 and transparent planarization layer 617. In the illustrated embodiment, transparent substrate 615 has a higher refractive index than transparent planarization layer 617. Rear projection screen 610 may also be fabricated using a combination of a UV imprinting process and optical bonding.

Figure 7:
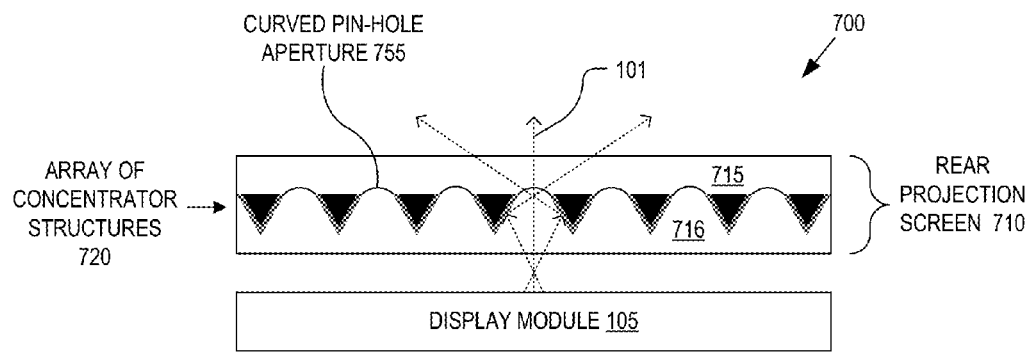
FIG. 7 illustrates a display panel including a rear projection screen having an array of pin-hole apertures that are curved with optical power, in accordance with an embodiment of the disclosure.

FIG. 7 illustrates a display panel 700 including a rear projection screen 710 having an array of pin-hole apertures 755 that are curved with optical power, in accordance with an embodiment of the disclosure. Display panel 700 is similar to display panel 100, but includes curved pin-hole apertures 755 formed into transparent substrate 715 between each of concentrator structures 120. The lensing power can be achieved by surrounding concentrator structures 720 with a planarization layer 716 that has a different refractive index than transparent substrate 715. Transparent substrate 715 may be fabricated of an optical grade plastic while planarization layer 716 may be fabricated of UV optical glue. The curvature of curved pin-hole apertures 755 along with the respective refractive indexes of transparent substrate 715 and planarization layer 716 can be selected to increase the divergence of display light 101 emitted through curved pin-hole apertures 755.

Figure 8:
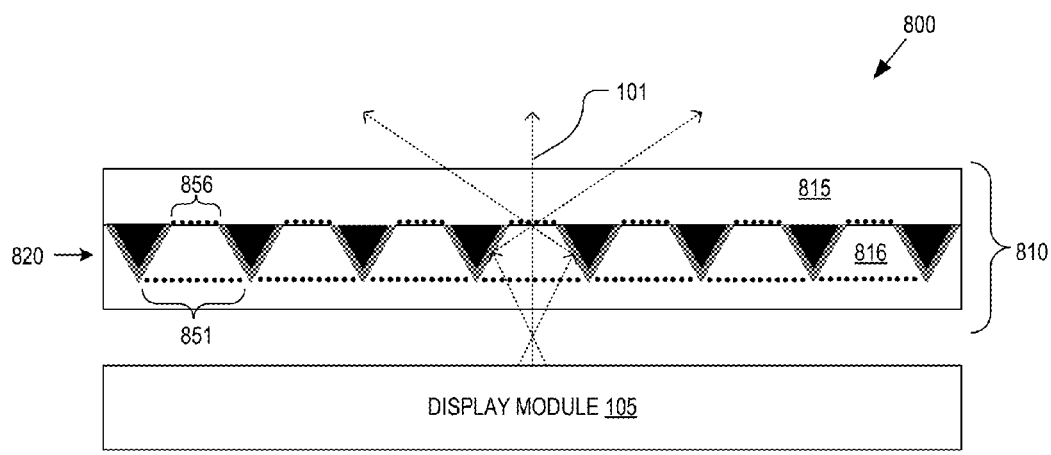
FIG. 8 illustrates a display panel including a rear projection screen having an array of pin-hole apertures and scattering elements, in accordance with an embodiment of the disclosure.

FIG. 8 illustrates a display panel 800 including a rear projection screen 810 having scattering elements disposed at one or more apertures defined by the array of concentrator structures 820, in accordance with an embodiment of the disclosure. Display panel 800 is similar to display panel 100 illustrated in FIG. 1, but further includes an array of scatter elements 851 disposed along the input apertures and/or an array of scatter elements 856 disposed along the pin-hole apertures. The scatter elements 851 and/or 856 server to further scatter display light 101 thereby further increasing the divergence of display light emitted through the pin-hole apertures and broaden viewing angles of display panel 800. The arrays of scattering elements 851 and 856 may be fabricated using a variety of elements or techniques. For example, scattering elements 851 and 856 may be transparent spherical beads that have a different refractive index than the surrounding planarization layer 816 or transparent substrate 815. Alternatively, scattering elements 851 and 856 may be diffraction gratings (e.g., Bragg gratings, holographic gratings, etc.), scallops scored into a surface, patterned photoresist, or other light scattering structures.

Figure 9A:
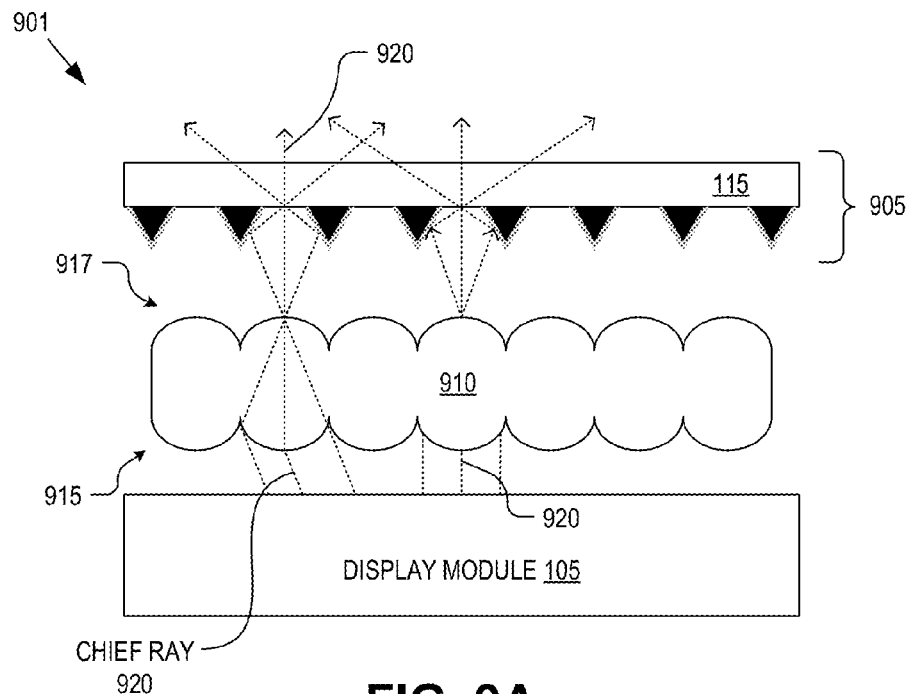
FIGS. 9A and 9B illustrate display panels including a rear projection screen and various lensing layers for bending chief rays, in accordance with embodiments of the disclosure.
Figure 9B:
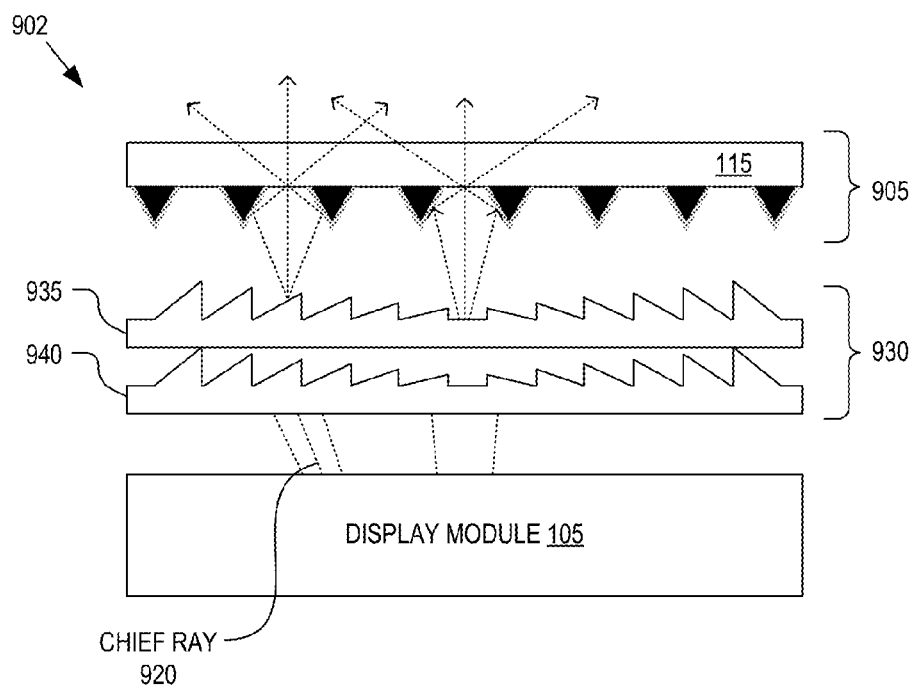

FIGS. 9A and 9B illustrate display panels with various lensing layers for bending chief rays, in accordance with embodiments of the disclosure. Display panels 901 and 902 both include a rear projection screen 905 that may be implemented with any one, or various combination thereof, of the rear projection screens disclosed above in connection with FIGS. 1-8.

The illustrated embodiment of display panel 901 includes a lensing layer 910 formed of a double sided lens array including lens arrays 915 and 917. Lens arrays 915 and 917 are aligned and offset from each other to bend the chief rays 920 of the display light towards the normal of transparent substrate 115. In the illustrated embodiment, display module 105 emits divergent display light. As chief rays 920 move outward from the center of display module 105, they become more and more oblique from the normal of transparent substrate 115. This variable obliqueness can result in non-uniform angular brightness from the viewing side. Accordingly, lensing layer 910 serves to bend chief rays 920 towards the normal of transparent substrate 115, thereby improving angular brightness uniformity of the display light emitted on the viewing side.

Although FIG. 9A illustrates a one-to-one alignment between a double sided lens of lensing layer 910 and pin-hole apertures on the rear projection screen 905, in other embodiments, the relationship need not be one-to-one. In one embodiment, the pitch of the double sided lenses is larger than the pitch between concentrator structures. In yet another embodiment, the position of the concentrator structures and pin-hole apertures can be randomized to reduce interference from reflected light.

FIG. 9B illustrates a display panel 902 with another implementation of a lensing layer 930 that bends the chief rays 920 of the display light towards the normal of transparent substrate 115. The illustrated embodiment of lensing layer 930 includes two Fresnel lenses 935 and 940. Fresnel lenses 935 and 940 also serve to bend divergent display light output from display module 105 to have chief rays 920 with more normal incidence. The chief ray bending can be implemented with a single Fresnel lens; however, chief ray normality is improved with multiple layers of Fresnel lenses. Although not illustrated, one or more planarization/offset layers between disposed between rear projection screen 905, lensing layer 930, and display module 105.

Figure 10A:
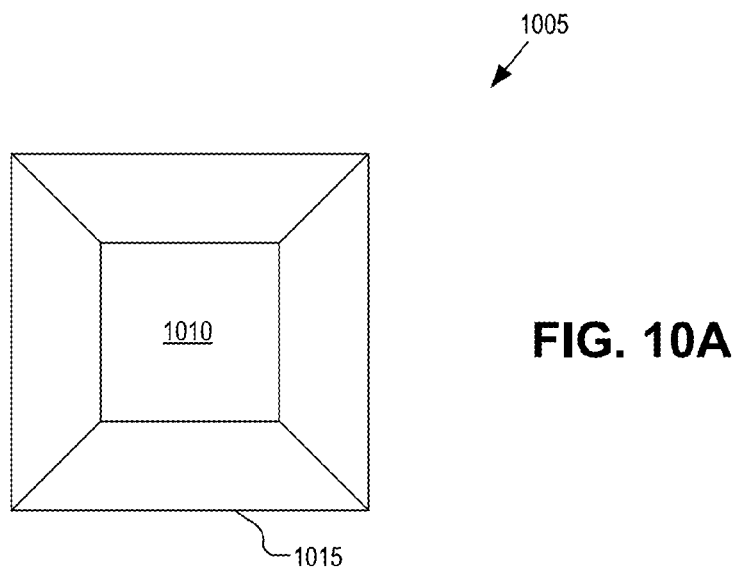
FIGS. 10A, 10B, & 10C illustrate various example cross-sectional shapes for pin-hole apertures and input apertures of the concentrator structures, in accordance with embodiments of the disclosure.
Figure 10B:
Figure 10C:
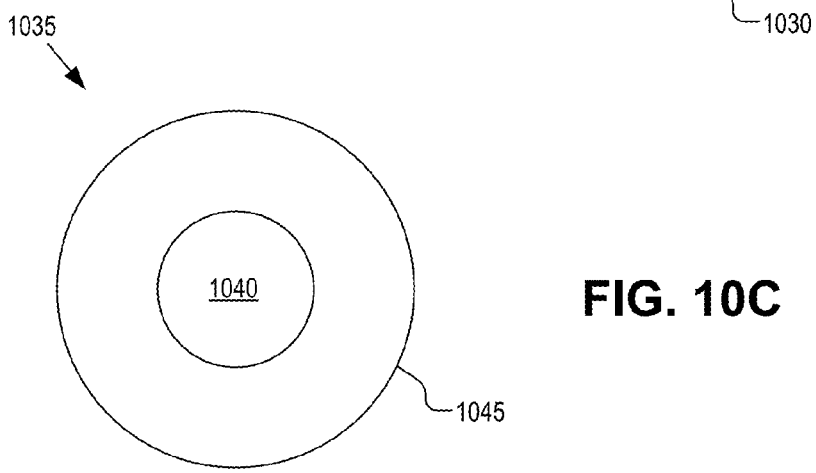

FIGS. 10A, 10B, & 10C illustrate various example cross-sectional shapes for pin-hole apertures and input apertures of the concentrator structures described above, in accordance with embodiments of the disclosure. FIG. 10A is a plan view of a concentrator structure 1005 having a square pin-hole aperture 1010 and a square input aperture 1015.

FIG. 10A is a plan view of a concentrator structure 1005 having a square pin-hole aperture 1010 and a square input aperture 1015. FIG. 10B is a plan view of a concentrator structure 1020 having a circular pin-hole aperture 1025 and a square input aperture 1030. Concentrator structure 1020 is a hybrid structure where its square input aperture 1030 serves to collect more input display light, while its circular pin-hole aperture 1025 provides improved angular uniformity. FIG. 10C is a plan view of a concentrator structure 1035 having a circular pin-hole aperture 1040 and a circular input aperture 1045. Other shapes and combinations of shapes may be implemented.

Figure 11B:
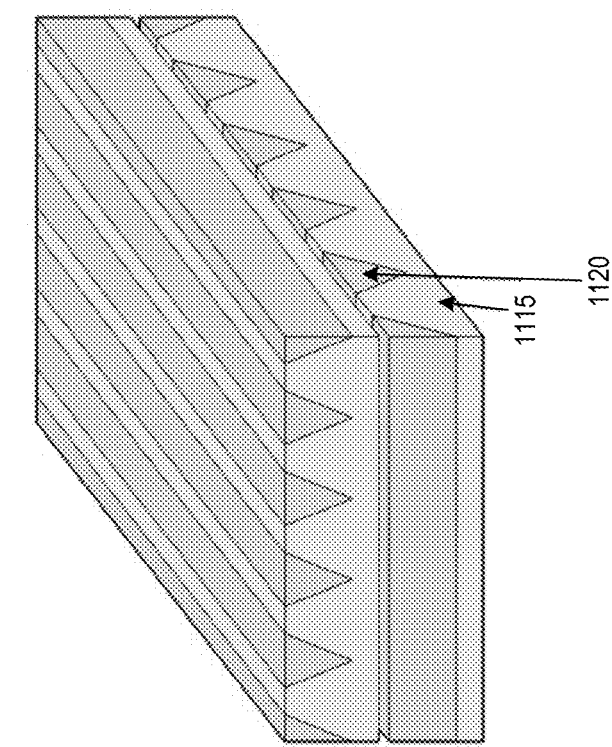
FIGS. 11A & 11B are perspective view illustrations of example arrays of concentrator structures, in accordance with embodiments of the disclosure.
Figure 11A:
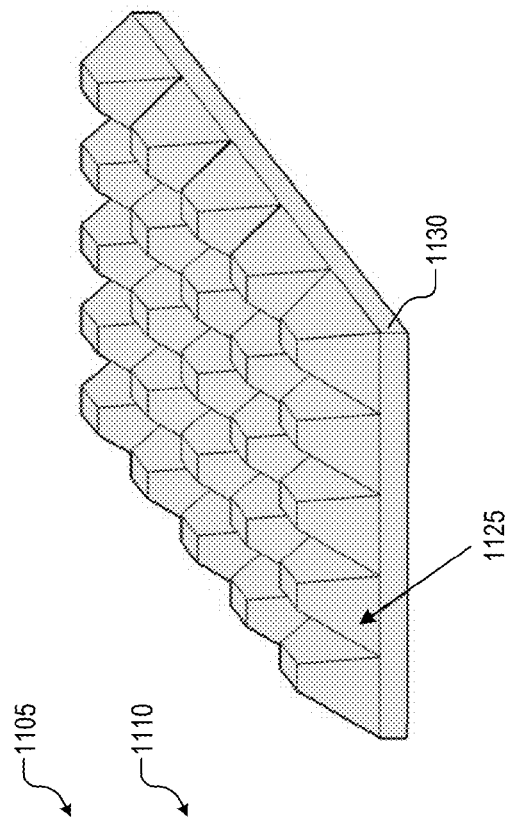

FIGS. 11A & 11B are perspective view illustrations of example arrays of concentrator structures, in accordance with embodiments of the disclosure. FIG. 11A illustrates two layers 1105 and 1110 of one-dimensional ("1D") arrays of concentrator structures. Each layer 1105 and 1110 provides 1D optical concentration of display light. However, the 1D arrays run orthogonal to each other to provide two-dimensional optical concentration. Each layer 1105 and 1110 is formed of alternating sections 1115 and 1120 with sections 1115 having a trapezoidal cross-section and sections 1120 defining the concentrating optical pathway through sections 1115. FIG. 11B illustrates a 2D array of individual concentrator structures 1125 formed in a single layer on a substrate 1130. Of course, other structures for concentrating light may be implemented.

Figure 12:
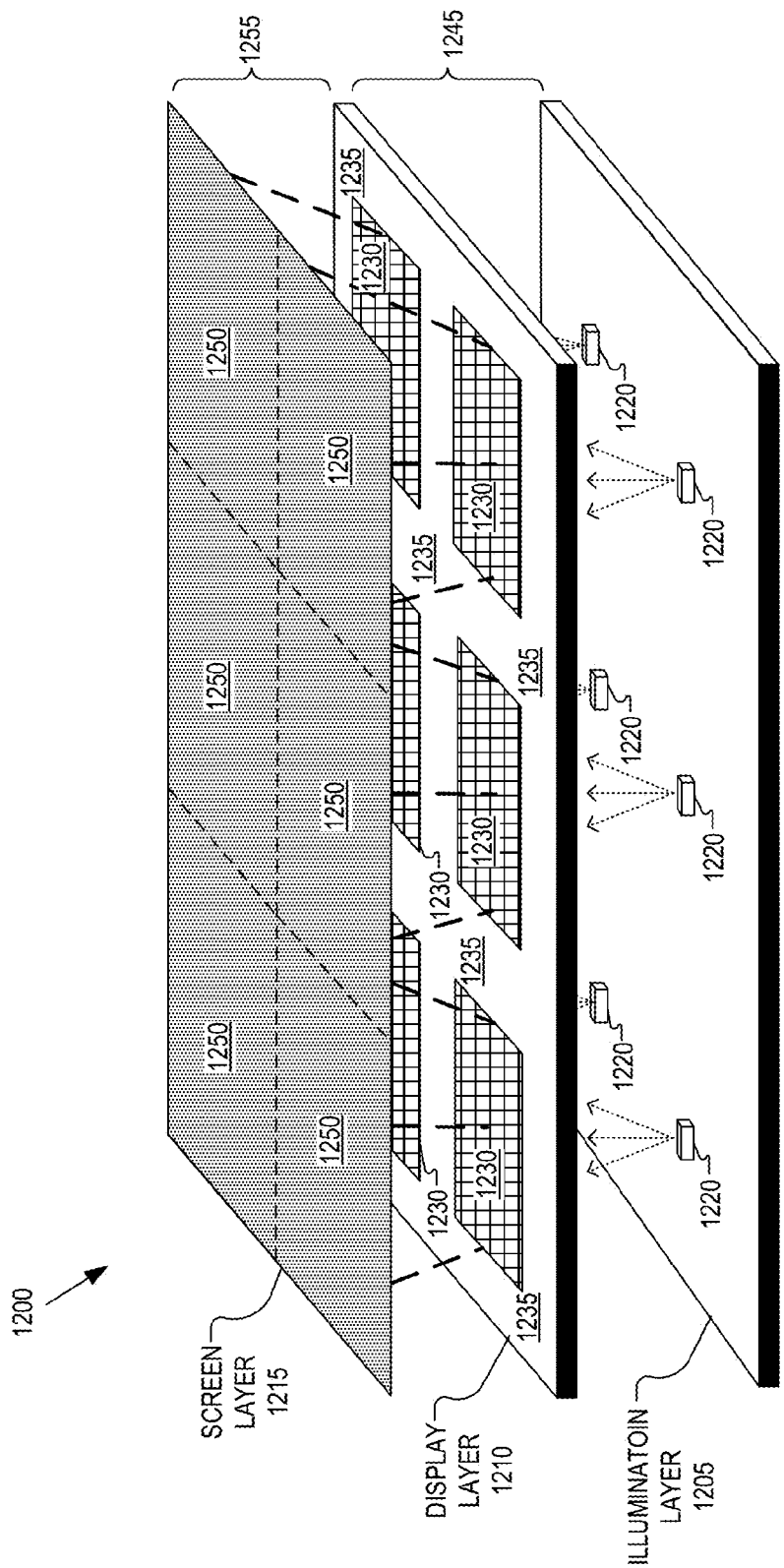
FIG. 12 is a perspective view illustrating functional layers of an example rear projection display, in accordance with an embodiment of the disclosure.

FIG. 12 is a perspective view illustrating functional layers of an example rear projection display 1200, in accordance with an embodiment of the disclosure. The illustrated embodiment of display 1200 includes an illumination layer 1205, a display layer 1210, and a screen layer 1215. Screen layer 1215 may be implemented with any of the rear projection screens described above in connection with FIGS. 1-11, or various combinations thereof. It should be appreciated that the rear projection screens disclosed above may also be used in connection with other rear projection architectures as well.

The illustrated embodiment of illumination layer 1205 includes an array of illumination sources 1220. The illustrated embodiment of display layer 1210 includes transmissive pixel arrays 1230 separated from each other by spacing regions 1235. The illustrated embodiment of screen layer 1215 is divided into regions for displaying image portions 1250 of an overall unified image. Rear projection display 1200 is made up of a plurality of pixlets, each including an illumination source 1220, transmissive pixel array 1230, and a screen region for displaying an image portion 1250 all aligned within a column through display 1200.

In the illustrated embodiment, each illumination source 1220 is aligned under a corresponding pixel array 1230 to illuminate a backside of the corresponding pixel array with lamp light. Illumination sources 1220 may be implemented as independent light sources (e.g., color or monochromatic LEDs, quantum dots, etc.) that emit light with a defined angular spread or cone to fully illuminate their corresponding transmissive pixel array 1230 residing above on display layer 1210. The illumination layer 1205 and display layer 1210 are separated from each other by a fixed distance 1245 (e.g., 8 mm). This separation may be achieved using a transparent intermediary (e.g., glass or plastic layers) and may further include one or more lensing layers (including lenses, apertures, beam confiners, etc.) to control or manipulate the angular extent and cross-sectional shape of the lamp light emitted from illumination sources 1220. In one embodiment, an illumination controller may be coupled to illumination sources 1220 to control their illumination intensity. Illumination layer 1205 may include a substrate upon which illumination sources 1220 are disposed.

Transmissive pixel arrays 1230 are disposed on the display layer 1210 and each includes an array of transmissive pixels (e.g., 100 pixels by 100 pixels). In one embodiment, the transmissive pixels may be implemented as backlit liquid crystal pixels. Each transmissive pixel array 1230 is an independent display array that is separated from adjacent transmissive pixel arrays 1230 by spacing regions 1235 on display layer 1210. The internal spacing regions 1235 that separate adjacent pixel arrays 1230 from each other may be twice the width as the perimeter spacing regions 1235 that separate a given pixel array 1230 from an outer edge of display layer 1210. In one embodiment, the internal spacing regions 1235 have a width of 4 mm while the perimeter spacing regions 1235 have a width of 2 mm. Of course, other dimensions may be implemented.

As illustrated, transmissive pixel arrays 1230 are spaced across display layer 1210 in a matrix with spacing regions 1235 separating each transmissive pixel array 1230. In one embodiment, transmissive pixel arrays 1230 each represent a separate and independent array of display pixels (e.g., backlit LCD pixels). Spacing region 1235 are significantly larger than the inter-pixel separation between pixels of a given transmissive pixel array 1230. Spacing regions 1235 provide improved flexibility for routing signal lines or the inclusion of additional circuitry, such as a display controller. Spacing regions 1235 that reside along the exterior perimeter of display layer 1210 also provide space for a bezel trim of display 1200. The spacing regions 1235 that reside along the exterior perimeter also provide space for power and/or communication ports.

Although FIG. 12 illustrates display layer 1210 as including six transmissive pixel arrays 1230 arranged into two rows and three columns, it should be appreciated that various implementations of display 1200 may include more or less transmissive pixel arrays 1230 organized into differing combinations of rows and columns. As such, in embodiments having a one-to-one ratio of illumination sources 1220 to transmissive pixel arrays 1230, the number and layout of illumination sources 1220 on illumination layer 1205 may also vary. While FIG. 12 does not illustrate intervening layers between the three illustrated layers for the sake of clarity, it should be appreciated that embodiments may include various intervening optical or structural sub-layers, such as lens arrays, transparent substrates to provide mechanical rigidity and optical offsets, protective layers, or otherwise.

Transmissive pixel arrays 1230 are switched under control of a display controller to modulate the lamp light and project image portions 1250 onto a backside of screen layer 1215. Image portions 1250 collectively blend together on screen layer 1215 to present a unified image to a viewer from the viewing side of screen layer 1215 that is substantially without seams. In other words, the images created by transmissive pixel arrays 1230 are magnified as they are projected across separation 1255 (e.g., 2 mm) between display layer 1210 and screen layer 1215. The image portions 1250 are magnified enough to extend over and cover spacing regions 1235 forming a seamless unified image. The magnification factor is dependent upon separation 1255 and the angular spread of the lamp light emitted by illumination sources 1220. In one embodiment, image portions 1250 are magnified by a factor of approximately 1.5. Not only does the unified image cover the internal spacing regions 1235, but also covers the perimeter spacing regions 1235. As such, display 1200 may be positioned adjacent to other display tiles 1200 and communicatively interlinked to form larger composite seamless displays, in which case the unified image generated by a single display tile becomes a sub-portion of a multi-tile unified image.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A rear projection screen, comprising:
   an array of pin-hole apertures to pass display light incident from a first side of the rear projection screen through to a viewing side of the rear projection screen opposite the first side; and
   an array of concentrator structures surrounding the pin-hole apertures, the concentrator structures defining concentrating optical pathways each having an input aperture for collecting the display light and an output defined by a corresponding one of the pin-hole apertures to emit the display light; and
   a linear polarizer layer disposed to linearly polarize the display light prior to the display light being incident upon the array of concentrator structures,
   wherein the input apertures are larger than the pin-hole apertures,
   wherein the array of concentrator structures includes reflective interfaces disposed along surfaces of the concentrator structures that define the concentrating optical pathways,
   wherein the reflective interfaces each comprise a reflective scattering layer that randomizes the polarization of the display light upon reflection and wherein the linear polarizer layer is positioned to reflect a portion of the display light back reflected from the reflective scattering layer back into the concentrating optical pathways.

2. The rear projection screen of claim 1, wherein the array of concentrator structures further comprises:
   a transparent substrate; and
   an array of structures disposed across the transparent substrate.

3. The rear projection screen of claim 2, wherein the structures comprise black light absorbing material that absorbs ambient light incident upon the structures from the viewing side of the rear projection screen.

4. The rear projection screen of claim 2, wherein the structures have one of triangular cross-sections that define the concentrating optical pathways with trapezoid cross-sections or curved surfaces that define the concentrating optical pathways with parabolic cross-sections.

5. The rear projection screen of claim 2, wherein the reflective interfaces comprise metallic reflective coatings.

6. The rear projection screen of claim 2, wherein the reflective interfaces comprise total internal reflection ("TIR") interfaces.

7. The rear projection screen of claim 1, further comprising:
   a circular polarizing layer disposed across the viewing side of the array of pin-hole apertures.

8. The rear projection screen of claim 1, wherein the pin-hole apertures comprise curved surfaces with optical power to increase divergence of the display light emitted from the pin-hole apertures.

9. The rear projection screen of claim 1, further comprising an array of scattering elements disposed along at least one of each of the pin-hole apertures or each of the input apertures to increase divergence of the display light emitted from the pin-hole apertures.

10. The rear projection screen of claim 1, further comprising:
    a lensing layer disposed across the array of concentrating structures to bend chief rays of the display light that are obliquely incident from the first side to be substantially normal to the pin-hole apertures.

11. The rear projection screen of claim 10, wherein the lensing layer comprises one of a double-sided lens array or one or more Fresnel lenses.

12. A display panel, comprising:
    a display module including a display layer overlaying an illumination structure to generate display light; and
    a rear projection screen disposed over the display module, the rear projection screen including:
        an array of pin-hole apertures to pass the display light incident from a back side of the rear projection screen through to a viewing side of the rear projection screen;
        an array of concentrator structures surrounding the pin-hole apertures, the concentrator structures defining concentrating optical pathways each having an input aperture for collecting the display light and an output defined by a corresponding one of the pin-hole apertures to emit the display light, wherein the input apertures are larger than the pin-hole apertures; and
        an array of scattering elements disposed along each of the input apertures to increase divergence of the display light exiting the rear projection screen.

13. The display panel of claim 12, wherein the array of concentrator structures comprises:
    a transparent substrate;
    an array of structures disposed across the transparent substrate; and
    reflective interfaces disposed along surfaces of the structures that define the concentrating optical pathways.

14. The display panel of claim 13, wherein the structures comprise black light absorbing material that absorbs ambient light incident upon the structures from the viewing side of the rear projection screen.

15. The display panel of claim 13, wherein the structures have one of triangular cross-sections that define the concentrating optical pathways with trapezoid cross-sections or curved surfaces that define the concentrating optical pathways with parabolic cross-sections.

16. The display panel of claim 13, wherein the reflective interfaces comprise metallic reflective coatings.

17. The display panel of claim 13, wherein the reflective interfaces comprise total internal reflection ("TIR") interfaces.

18. The display panel of claim 13, further comprising:
    a linear polarizer layer disposed to linearly polarize the display light prior to the display light being incident upon the array of concentrator structures,
    wherein the reflective interfaces comprises a reflective scattering layer that randomizes the polarization of the display light upon reflection.

19. The display panel of claim 12, further comprising another array of scattering elements disposed along each of the pin-hole apertures to increase divergence of the display light emitted from the pin-hole apertures.

20. The display panel of claim 12, further comprising:
    a lensing layer disposed across the array of concentrating structures to bend chief rays of the display light that are obliquely incident from the back side to be substantially normal to the pin-hole apertures.

* * * * *